United States Patent
Pognant (10) Patent No.: US 11,677,752 B2
(45) Date of Patent: Jun. 13, 2023

(54) METHOD FOR CONFIGURING REMOTE ACCESS, CONTROL AND SUPERVISION OF AT LEAST ONE HOME AUTOMATION DEVICE BELONGING TO A HOME AUTOMATION INSTALLATION

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 220 days.

(21) Appl. No.: 16/473,565

(22) PCT Filed: Dec. 21, 2017

(86) PCT No.: PCT/FR2017/053774
§ 371 (c)(1),
(2) Date: Sep. 25, 2019

(87) PCT Pub. No.: WO2018/122508
PCT Pub. Date: Jul. 5, 2018

(65) Prior Publication Data
US 2020/0021593 A1    Jan. 16, 2020

(30) Foreign Application Priority Data
Dec. 28, 2016  (FR) ...................................... 16/63451

(51) Int. Cl.
*H04L 9/40*  (2022.01)
*H04L 12/28*  (2006.01)
(Continued)

(52) U.S. Cl.
CPC .............. *H04L 63/10* (2013.01); *G16Y 30/00* (2020.01); *H04L 12/283* (2013.01);
(Continued)

(58) Field of Classification Search
CPC . H04L 12/2803–2838; H04L 29/06755–0685; H04L 63/10–108;
(Continued)

(56) References Cited

U.S. PATENT DOCUMENTS 5,944,794 A    8/1999  Okamoto et al.
9,946,857 B2   4/2018  Beals
(Continued)

FOREIGN PATENT DOCUMENTS

CN    104038414 A    9/2014
CN    105245420 A    1/2016
(Continued)

OTHER PUBLICATIONS

International Search Report for Application No. PCT/FR2017/053774.
(Continued)

*Primary Examiner* — Brendan Y Higa
(74) *Attorney, Agent, or Firm* — Cantor Colburn LLP (57) ABSTRACT

The present invention relates to a method of remotely configuring access to at least one home automation device (D) that is part of a home-automation installation (Su), the home automation installation comprising at least one home automation device (D) and at least one central control unit (U), and the method being performed by a first remote access service (Svc1) carried out by a management unit (Sv) and comprising the following steps: receiving (ECfSvc12) an information message (MIn) relating to the presence of the home automation device (D) from a central control unit (U) to which the device (D) is linked; determining (ECfSvc13) a second service (Svc2) associated with the type of home automation device (D) for which remote access must be configured with corresponding access rules; configuring (ECfSvc110) an access rights reference system in order to
(Continued)

accept at least one control command (MCa) from the second service (Svc2) or transmitting monitoring data (MSa) to the second service (Svc2) on behalf of the home automation device (D). The invention also relates to a control and monitoring method.

10 Claims, 6 Drawing Sheets

(51) Int. Cl.
    *H04L 41/0806*     (2022.01)
    *H04L 67/125*     (2022.01)
    *G16Y 30/00*     (2020.01)
    *H04L 67/51*     (2022.01)

(52) U.S. Cl.
    CPC ...... *H04L 12/2809* (2013.01); *H04L 12/2818* (2013.01); *H04L 12/2825* (2013.01); *H04L 12/2829* (2013.01); *H04L 12/2836* (2013.01); *H04L 41/0806* (2013.01); *H04L 41/0809* (2013.01); *H04L 63/0807* (2013.01); *H04L 63/101* (2013.01); *H04L 63/20* (2013.01); *H04L 67/125* (2013.01); *H04L 67/51* (2022.05); *H04L 2012/285* (2013.01); *H04L 2012/2841* (2013.01)

(58) Field of Classification Search
    CPC . H04L 9/32–3234; H04L 12/283–2838; H04L 29/06823–0685; H04L 41/0806–0809; H04L 63/08–0846; H04L 67/12–125; G16Y 20/00–40; G16Y 30/00–10; H04W 84/18–22
    See application file for complete search history.

(56) References Cited

U.S. PATENT DOCUMENTS

| | | | | |
|---|---|---|---|---|
| 10,075,334 | B1* | 9/2018 | Kozura | H04W 12/086 |
| 10,084,794 | B2 | 9/2018 | Goldfarb et al. | |
| 10,530,598 | B2 | 1/2020 | Ansari et al. | |
| 10,645,089 | B2 | 5/2020 | Chung et al. | |
| 11,394,572 | B2 | 7/2022 | Pognant et al. | |
| 2002/0180581 | A1 | 12/2002 | Kamiwada et al. | |
| 2003/0051169 | A1 | 3/2003 | Sprigg et al. | |
| 2003/0061380 | A1 | 3/2003 | Saito et al. | |
| 2007/0288487 | A1 | 12/2007 | Song et al. | |
| 2009/0320113 | A1 | 12/2009 | Larsen et al. | |
| 2014/0159879 | A1 | 6/2014 | Rezvani et al. | |
| 2015/0074259 | A1 | 3/2015 | Ansari et al. | |
| 2015/0097689 | A1* | 4/2015 | Logue | H04W 4/38 340/632 |
| 2015/0370615 | A1* | 12/2015 | Pi-Sunyer | G08B 17/10 700/276 |
| 2015/0373022 | A1* | 12/2015 | Dubman | H04L 63/10 726/3 |
| 2016/0112262 | A1* | 4/2016 | Johnson | G06F 9/4411 709/221 |
| 2016/0134432 | A1 | 5/2016 | Hund et al. | |
| 2016/0277413 | A1 | 9/2016 | Ajitomi et al. | |
| 2017/0006471 | A1* | 1/2017 | Kim | H04L 63/083 |
| 2017/0063931 | A1 | 3/2017 | Seed et al. | |
| 2017/0346905 | A1 | 11/2017 | Pognant | |
| 2018/0091355 | A1* | 3/2018 | Tamura | G06F 21/41 |
| 2018/0270075 | A1 | 9/2018 | Cosserat et al. | |
| 2019/0036721 | A1 | 1/2019 | Pognant et al. | |
| 2019/0036727 | A1* | 1/2019 | Matson | H04L 63/1408 |
| 2019/0052683 | A1* | 2/2019 | Logue | H04L 12/2823 |
| 2019/0229985 | A1 | 7/2019 | Coote | |
| 2019/0306144 | A1* | 10/2019 | Pognant | H04L 63/102 |
| 2020/0044884 | A1 | 2/2020 | Pognant | |
| 2020/0125087 | A1 | 4/2020 | Wu | |
| 2020/0233388 | A1* | 7/2020 | Pognant | H04L 12/2825 |
| 2020/0349952 | A1* | 11/2020 | Lee | G10L 15/1822 |
| 2021/0056184 | A1 | 2/2021 | Modani et al. | |
| 2021/0266326 | A1* | 8/2021 | Chen | H04L 63/102 |
| 2021/0336963 | A1* | 10/2021 | Rovito | H04L 63/08 |

FOREIGN PATENT DOCUMENTS

| | | |
|---|---|---|
| EP | 1260906 A1 | 11/2002 |
| EP | 2416600 A1 | 2/2012 |
| WO | 02093502 A1 | 11/2002 |
| WO | 2009080398 A1 | 7/2009 |
| WO | 2016038374 A1 | 3/2016 |

OTHER PUBLICATIONS

Written Opinion for Application No. PCT/FR2017/053774.
Carles Gomez et al: "Wireless home automation networks: A survey of architectures and technologies", IEEE communications magazine, IEEE Service Center; vol. 48, No. 6, (Jun. 1, 2010).
English Translation of the Written Opinion for Application No. PCT/FR2017/053773.
International Search Report for Application No. PCT/FR2017/053773.
International Search Report for Application No. PCT/FR2017/053775.
John Blackford et al: "TR-069 CPE WAN Management Protocol", pp. 1-228 (Jan. 8, 2014).
Written Opinion for Application No. PCT/FR2017/053773.
Written Opinion for Application No. PCT/FR2017/053775.
U.S. Non Final OA dated Apr. 30, 2021 for U.S. Appl. No. 16/473,571.
Echonet Consortium: "-i- ECHONET Lite Specification II ECHONET Lite Communication Middleware Specification", Sep. 3, 2012, pp. 1-52.
English Translation First Office Action for CN Application No. 201780020699.X; dated Jan. 23, 2017; 8 Pages.
First Office Action for Application No. CN201780020699.X; 5 pages.
First Search for Application No. 201780020699.X.
International Search Report for Application No. PCT/FR2017/050134; dated Apr. 4, 2017; 6 Pages.
U.S. Final Office Action dated Jul. 15, 2022, U.S. Appl. No. 16/473,568, filed Mar. 31, 2020; (21 pages).
U.S. Non-Final Office Action dated Feb. 3, 2022, U.S. Appl. No. 16/473,568, filed Mar. 31, 2020; (44 pages).
U.S. NonFinal Office Action dated Jun. 23, 2020, U.S. Appl. No. 16/073,274, filed Jul. 26, 2018; 10 pages.
U.S. NonFinal Office Action dated Jan. 4, 2021, U.S. Appl. No. 16/073,274, filed Jul. 26, 2018; 13 pages.
Written Opinion for Application No. PCT/FR2017/050134; dated Apr. 4, 2017; 16 Pages.
Notice of Allowance for U.S. Appl. No. 16/473,568; dated Oct. 26, 2022; 15 pages.

* cited by examiner

METHOD FOR CONFIGURING REMOTE ACCESS, CONTROL AND SUPERVISION OF AT LEAST ONE HOME AUTOMATION DEVICE BELONGING TO A HOME AUTOMATION INSTALLATION

CROSS REFERENCE TO RELATED APPLICATIONS

This application is a National Stage of PCT Application No. PCT/FR2017/053774 filed on Dec. 21, 2017, which claims priority to French Patent Application No. 16/63451 filed on Dec. 28, 2016, the contents each of which are incorporated herein by reference thereto.

FIELD OF THE INVENTION

The present invention concerns a method for configuring access, a method for controlling and a method for supervising at least one home automation device of a home automation installation.

PRIOR ART

A building home automation installation may comprise a plurality of home automation devices. It is known to proceed to the configuration, and the monitoring, that is to say the control and/or supervision of said installation by using a central control unit which communicates with one or more home automation devices.

Users may wish to use third-party services to exploit the data generated by the home automation devices of the installation or allow monitoring by third-party services.

However, the heterogeneity of home automation devices and the management of access to each device aiming at ensuring the security of the home automation installation, make such an opening of the system difficult.

The purpose of the present invention is to overcome all or part of the disadvantages mentioned above.

DISCLOSURE OF THE INVENTION

To this end, the present invention concerns a method for configuring remote access to at least one home automation device belonging to a home automation installation, the home automation installation comprising the at least one home automation device and at least one central control unit, the method being implemented by a first remote access service executed by a management unit and comprising the following steps:
  Receiving an information message concerning a presence of the home automation device coming from a central control unit to which the device is attached;
  Determining a second service associated with a type of home automation device for which a remote access must be configured with corresponding access rules;
  Configuring an access right repository in order to accept at least one control command coming from the second service or sending supervision data to the second service on behalf of the home automation device.

Thanks to arrangements of the invention, a second service can easily obtain access to at least one home automation device belonging to a home automation installation while maintaining a monitoring by the management unit, and without having to establish an access infrastructure to the home automation device, via the first service.

According to one mode of implementation, the acceptance of the remote access of the second service may be global for a given installation attached to the user account of the user, or may concern only one group of devices or a particular home automation device. Similarly, this inscription may concern the set of state variables or controls of a device, or concern a subset of state variables or controls of a concerned device according to a filtering.

According to one mode of implementation, the access right repository stores the correspondence between a second service and the authorized actions on resources of the first service. A resource may in particular comprise an identifier of a logical element of a home automation installation or a home automation device under the monitoring of the first service.

The scope or granularity of the access authorization may be predefined according to the service concerned by the access request, or by the transmitter of the authorization. Different granularity levels can be provided depending on the possibilities of the first service.

Thus, a resource may consist of an entire installation or a home automation device or a set of devices, or even one or more controls or functions or state variables of a home automation device.

According to one mode of implementation, the access rights repository may use calculation algorithms taking as input the information of the device, the state variable and the second service (identifier and value type) and returning a Boolean result indicating whether the access is authorized. These arrangements allow limiting the data stored in the repository by using logical rules for determining the authorizations for a given device and limiting the extensive research in this repository, which allows improving the performances.

According to one mode of implementation, the information message concerning the presence of the home automation device corresponds to the establishment of a connection between the central control unit and the home automation device and/or to the discovery of the home automation device by the central control unit. The connection is made via a network, in particular a home automation network. For example, this situation may correspond to the installation of a device by a user or an installer in a home automation installation and to the pairing or discovery of the home automation device with a central control unit present in the installation, or else to the installation of a central control unit and the pairing or discovery by this central control unit of a previously installed home automation device.

According to one mode of implementation, the home automation device and/or the installation are/is attached to a profile or user account on the first service. The profile or user account on the first service can be associated with a user identifier Usr1ID1 on the first service.

According to one mode of implementation, the second service proceeds to the creation of an account for the user, with a corresponding identifier Usr1ID2, and can save the correspondence between the user identifier Usr1ID1 on the first service, and the user identifier Usr1ID2 on the second service, as well as the corresponding identification token.

According to one mode of implementation, the second service then communicates to the first service a confirmation of the creation of the user account and optionally the created identifier Usr1ID2.

Within the meaning of the present invention, a state variable is a descriptive element of the state of a home automation device. The value of a state variable may correspond to the on or off for a switch, or to a degree or percentage of opening for a shutter. Moreover, a state variable may correspond to a sensor measurement value, for example to a value of a physical or environment quantity. The description of the states of the devices can be generic or specialized, depending on the local protocol. The identifiers of the state variables can be numeric or alphanumeric. The values of the state variables can use formats or custom or proprietary scales.

Within the meaning of the present invention, a control corresponds to a command that can be given to a home automation device in order to perform an action by this device or to obtain an information in return, for example an information relating to a state variable of this device.

According to one mode of implementation, the management unit executing the first service is a server remotely connected to the at least one home automation installation, via a wide area network. It should be noted that the term server is a logical designation that can cover the use of several physical servers to distribute the computer processing load to be carried out.

According to another aspect of the invention, the management unit executing the first service may be a central unit intended to be connected to one or more central control unit(s) on separate private or local area networks, or else on the same local area network.

The management unit executing the second service is a server remotely connected with the management unit executing the first service. As previously, the term server is a logical designation that can cover the use of several physical servers to distribute the computer processing load to be carried out.

Within the meaning of the present invention, a home automation device is a home automation equipment and/or a sensor, or else a home automation equipment part or a sensor part corresponding to a functional subset. A home automation device may also correspond to a control point of other home automation devices.

Within the meaning of the present invention, a message is a piece of information notified or received via a communication module from an external equipment, or in the form of a synchronous or asynchronous call, which may also correspond to a local or remote function call.

Within the meaning of the present invention, an installation is a set comprising a plurality of home automation devices and at least one central control unit disposed in a single building or over a plurality of premises, each home automation device being connected to one central control unit among the plurality of central control units, the plurality of central control units forming a group under the monitoring of a user. The electronic devices form groups of at least one home automation device attached to a central control unit.

Within the meaning of the present invention, a central control unit of the home automation installation is an electronic unit comprising:
- at least one processing unit to contain and execute at least one computer program,
- at least one communication module intended to monitor and/or control at least one home automation device; and
- at least one communication module with the management unit.

The electronic unit can be independent or integrated into a home automation device. In the latter case, the communication module intended to monitor and/or control the device may be a communication module internal to the home automation device and/or a communication module intended to monitor and/or control other home automation devices. In some applications, a central control unit can communicate with the management unit via an intermediate management unit, for example a third-party service provider, whose intermediate management unit provides a service interface or API.

It is also possible that the central control unit is integrated into a router and/or modem making a connection to a wide area network, in particular to Internet.

Within the meaning of the present invention, a first service corresponds to a user service intended to monitor the home automation installation by a final user. The user service is a remotely accessible computerized service, which allows access to at least one monitoring or supervision function of a home automation installation or a home automation device, by means of a user interface. The user interface can be accessed by a graphical interface, or via a programming interface.

A second service corresponds to a third-party service, which is able to remotely generate at least one instruction for performing at least one control for at least one home automation device of an installation or to process data coming from at least one home automation device.

The first service can be under the monitoring of a first entity and the second service can be under the monitoring of a second entity.

According to one mode of implementation, the step of determining a second service associated with a type of home automation device for which a remote access must be configured comprises a consultation of an access rules definition repository.

According to one mode of implementation, the access rules definition repository may comprise at least one association between a type of home automation device, at least one second service and optionally access or filtering rules. The access rules definition repository, which can be comprised in the access right repository or distinct, but accessible by the first service.

According to one mode of implementation, the configuration step comprises a step of generating an identification token for the second service.

This arrangement allows securely identifying requests coming from a second service. Thus, a second service, accepted by a user associated with a home automation installation managed by the first service and containing at least one home automation device, will have to provide the identification token in its request to the first service.

According to one mode of implementation, the identification token is then transmitted to the second service, directly or via the acceptance message transmitter.

According to one mode of implementation, this identification token may be of permanent or time-limited validity.

According to one mode of implementation, this token will be stored in the access repository. This arrangement allows performing the correspondence with the authorizations on resources.

According to one mode of implementation, the configuration method comprises the following step, prior to the configuration step:
Requesting an access authorization for the benefit of the second service to the user.

According to one mode of implementation, the user receives the acceptance request via a terminal.

According to one mode of implementation, which corresponds to the first case, the user confirms his acceptance or authorization of the access request in a response that is received by the first service.

According to one mode of implementation, the configuration method comprises the following step:

Sending an acceptance/registration message to the second service.

According to one mode of implementation, the step of sending an acceptance/registration message to the second service by the first service is posterior to the configuration step.

According to one mode of implementation, the configuration method comprises the following step:

Sending at least one description or transmission message of a filtered view of the installation or a group of home automation devices comprising at least one device, to the second service.

According to one mode of implementation, the method comprises an additional step of registering the second service as a subscriber to events concerning the at least one device.

The present invention also concerns a method for configuring remote access to at least one home automation device belonging to a home automation installation, the home automation installation comprising the at least one home automation device and at least one central control unit, the home automation installation being accessible by a first remote access service, the method being implemented by a second remote access service and comprising the following steps:

Receiving an access authorization concerning at least one home automation device for the benefit of the second service;

Configuring a profile or account for a user, under whose monitoring is placed the home automation device on the second service and saving a correspondence between the user identifier on the first service, and the user identifier on the second service.

According to one mode of implementation, the remote access authorization can identify the user by the identifier Usr1ID1.

According to one mode of implementation, the method comprises a step of receiving an identification token to the first service.

According to one mode of implementation, the method comprises a step of saving an identification token to the first service in correspondence with a user profile or account.

The present invention also concerns a method for remotely controlling at least one home automation device belonging to a home automation installation, the home automation installation comprising the at least one home automation device and at least one central control unit, the method being implemented by a first remote access service executed by a management unit and comprising the following steps:

Receiving a control message concerning at least one control to be carried out on the at least one home automation device coming from a second service;

Verifying the authorization of the control requested in the message for the service from an access rights repository;

In the case where the control is authorized for the second service, sending at least one control message to at least one central control unit to which the at least one home automation device concerned by the control is attached.

According to one mode of implementation, the verification of the authorization consists in verifying whether it concerns at least one home automation device for which remote access has been authorized, and/or whether the concerned control or function is authorized for this home automation device for the second service.

According to one mode of implementation, the token is obtained during a prior authorization step.

The format of the control message received by the first service can be distinct from that of the control message sent to the central control unit, a format conversion can be performed by the first service.

According to one mode of implementation, the central control unit transmits a control message to the home automation device concerned by the control that receives it in a step. The format of this message can be distinct from that of the message, a format conversion can be performed by the central control unit. According to one mode of implementation, the home automation device then performs the control. The home automation device can communicate a return code or a result of the control in a return message to the central control unit.

According to one mode of implementation, the control message concerning at least one control to be carried out on the at least one home automation device coming from a second service comprises an identification token; the method further comprises a step of verifying the validity of the identification token for the service from the access rights repository.

According to one mode of implementation, the control method further comprises the following steps:

Receiving a return message coming from the central control unit to which the device is attached.

Verifying the authorization to send a return message for the control to the service from an access rights repository;

In the case where the communication of the control return code is authorized for the second service, sending a return message to the second service.

According to one mode of implementation, the verification of the authorization consists in verifying whether the return message concerns at least one home automation device for which remote access has been authorized, and/or whether the return code of the concerned control or function is authorized for this home automation device for the second concerned service.

According to one mode of implementation, the format of this message sent to the second service can be distinct from that of the message communicated by the central control unit, a format conversion can be performed by the first service.

According to one mode of implementation, the control method comprises the steps of a configuration method as described above.

The present invention also concerns a method for remotely controlling at least one home automation device belonging to a home automation installation, the home automation installation comprising the at least one home automation device and at least one central control unit, the home automation installation being accessible by a first remote access service, the method being implemented by a second remote access service and comprising sending a control message concerning at least one control to be carried out on the at least one home automation device to the first service.

According to one mode of implementation, the control message comprises an identification token.

According to one mode of implementation, the control method comprises the steps of a configuration method as described above.

The present invention also concerns a method for remotely supervising at least one home automation device belonging to a home automation installation, the home automation installation comprising the at least one home automation device and at least one central control unit, the method being implemented by a first remote access service executed by a management unit and comprising the following steps:

Receiving a supervision message coming from a central control unit comprising information concerning at least one state variable of the at least one home automation device attached to the central control unit.

Verifying the authorization to send a supervision message concerning the state variable of the home automation device to the second service from an access rights repository;

In the case where the sending of the supervision message is authorized, sending a supervision message to the second service.

According to one mode of implementation, the verification of the authorization consists in determining whether it concerns at least one home automation device for which remote access has been authorized, and/or whether the data communication relating to the concerned state variable is authorized for this home automation device for the second service.

Thanks to the arrangements of the invention, a filtering on one type of state variable can be performed or even a filtering over ranges of a state variable value.

According to one mode of implementation, the supervision message may correspond to an event of change in the state variable value.

The format of the received message can be distinct from that of the sent message, a format conversion can be performed by the first service.

Transmitting the supervision message by the central control unit can be subsequent to receiving a supervision message coming from the home automation device by the central control unit. This message may for example correspond to an event of change in a state variable value.

According to one variant, in the case where the central control unit is integrated into the device, constituting the supervision message can be performed locally upon detecting the trigger event corresponding to the change in a state variable value.

According to another variant, in the case where the central control unit is distinct from the device, it is also possible that the device sends messages periodically and it is the central control unit that operates a verification to identify the changes in value. Finally, it is also possible that supervision messages are sent to the first service without noting a change in value.

Sending the supervision message by the first service to the second service can correspond to a direct notification between the first service and the second service which corresponds to a direct sending. However, it is possible that other mechanisms are used.

Particularly, according to a first variant, a queuing mechanism can be implemented, the messages can be stored by the first service on the queue, and asynchronously collected by the second service.

According to one mode of implementation, the method comprises a step of verifying the validity of the identification token for the service from the access rights repository. Thus, if the token is not valid, particularly if the validity of the token has expired when the verification is performed, no supervision message is sent to the second service. For example, it may also be provided that the token for a second service is invalidated by the first service if there is no longer any agreement between the first entity monitoring the first service and the second entity monitoring the second service or else if the user deletes his authorization to the second service. It is also possible that the token is invalidated after a predetermined period if the token is not renewed.

The present invention also concerns a method for remotely supervising at least one home automation device belonging to a home automation installation, the home automation installation comprising the at least one home automation device and at least one central control unit, the home automation installation being accessible by a first remote access service, the method being implemented by a second remote access service and comprising receiving a supervision message coming from the first service comprising information concerning at least one state variable of a home automation device.

According to one mode of implementation, the method comprises a local storage of information relating to the state variables by the second service.

According to one mode of implementation, the method further comprises the following step:

Storing information relating to the state variables by the first service.

According to one mode of implementation, filtering information is performed prior to the storage. This configuration is in particular useful in the case where the device is the property or under the monitoring of a second entity in charge of the second service, the first service and optionally the central control unit, being under the monitoring of a first entity and acting as an infrastructure service.

According to one mode of implementation, a local storage of information relating to the state variables can be performed by the second service.

According to one mode of implementation, the supervision method comprises the steps of a configuration method as described above.

The different aspects defined hereinabove that are not incompatible can be combined.

BRIEF DESCRIPTION OF THE FIGURES

The invention will be better understood using the detailed description exposed below with reference to the appended drawing in which.

DESCRIPTION WITH REFERENCE TO THE FIGURES

In the following detailed description of the figures defined above, the same elements or elements fulfilling identical functions may preserve the same references in order to simplify the understanding of the invention.

Description of a System Comprising a Home Automation Installation

Figure 1:
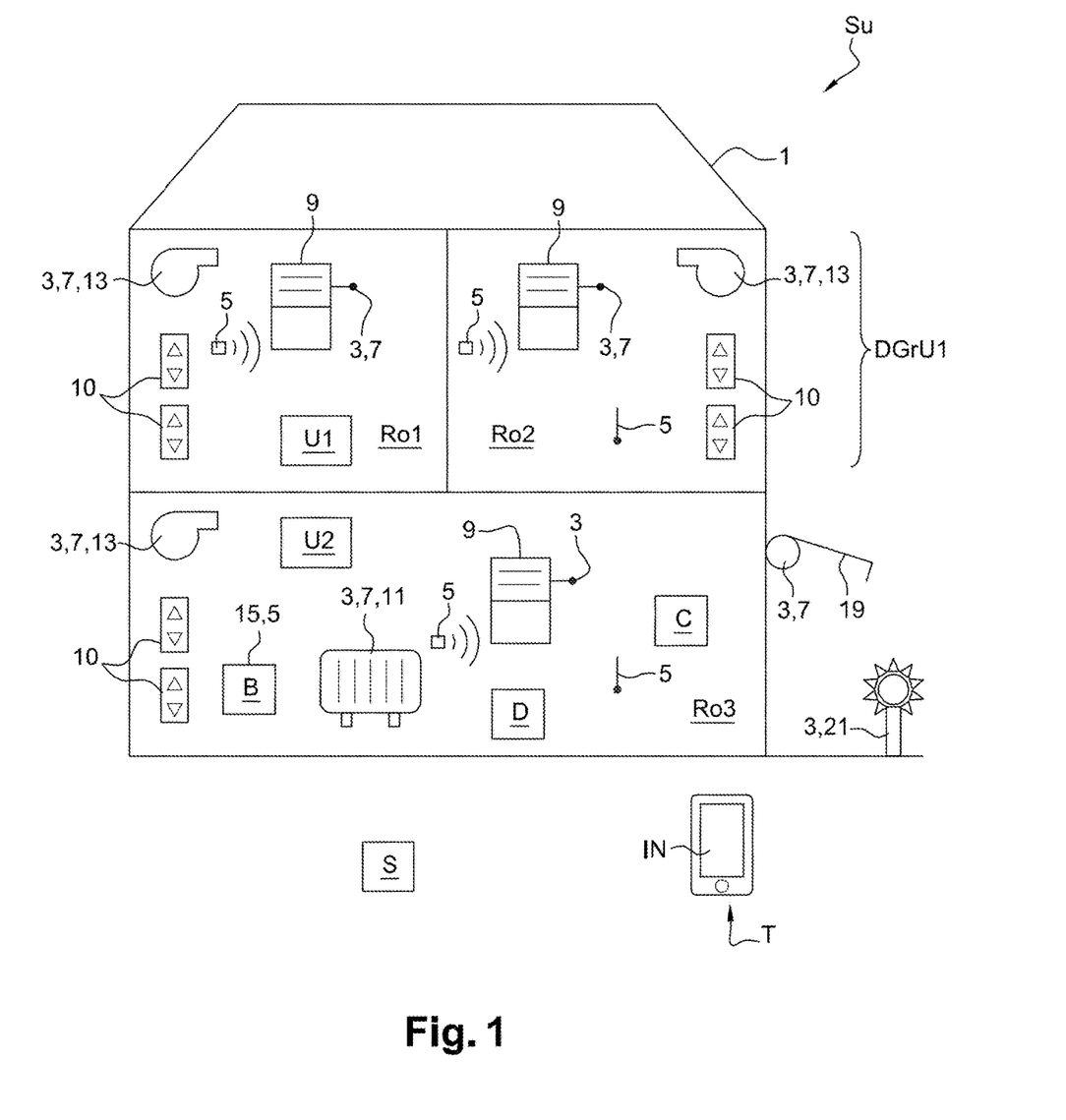
FIG. 1 is a schematic view of a building and a home automation installation in accordance with one embodiment of the invention.

As illustrated in FIG. 1, a building 1 comprises, for example, three rooms Ro1, Ro2, Ro3. The building 1 also comprises home automation equipment 3 and sensors 5.

A home automation equipment 3 can be an actuator arranged to move or adjust an element of the building 1, for example an actuator 7 for moving a roller shutter 9 or a terrace awning 19, or a regulation system 10 for a heater 11 or an aeraulic system 13. A home automation equipment 3 may also be a lighting, for example a terrace outdoor lighting 21 or a lighting control system, an alarm system, or else a video camera, particularly a video surveillance camera.

The home automation installation Su may also comprise a control point 15 of an actuator 7, such as a wireless control box B for the roller shutter 9.

The home automation installation Su may comprise one or more sensor(s) 5, integrally to an actuator 7, a control point 15 or else the control box B, or independently of these elements. A sensor 5 may, in particular, be arranged to measure a physical quantity, for example a temperature sensor, a sunlight sensor or a humidity sensor. Home automation equipment 3 position sensors 5 of the building 1, such as, for example, sensors for the open state of a roller shutter 9 or position sensors of a door leaf such as a window, motorized or not, may also be provided. The home automation installation may also comprise one or more presence sensor(s). The installation may also comprise one or more power consumption sensor(s).

A home automation equipment 3 and a sensor 5 are thus to be considered as units having available information on observed actual states of the building 1 elements and being able to share this information with other elements of the home automation installation Su.

The home automation equipment 3 and the sensors 5 can thus have access to any measurable physical quantity, such as the temperature of each room Ro1, Ro2, Ro3 or a state of a building element 1, such as the open state of a roller shutter 9, the status of an alarm, etc.

Subsequently, the designation of home automation device or device D will be used indifferently to designate sensors or home automation equipment, or else parts of home automation equipment 3 or sensors 5.

The home automation devices generally comprise a processing unit comprising a processor executing an embedded software. This software is updated to improve its functions or make corrections.

The home automation installation Su comprises a central control unit or a plurality of central control units U1, U2. Particularly and for example, two central control units U1, U2 are shown in FIG. 1. According to one variant, a home automation installation may also comprise a single central control unit.

Each central control unit U1, U2 is arranged to control and/or monitor part of the devices D of the installation Su forming a group DGrU1, DGrU2. For example, in FIG. 1, the central control unit U1 is in charge of the devices D disposed in the rooms Ro1 and Ro2 of the first floor of the building, while the central control unit U2 is in charge of the devices D disposed in the room Ro3 on the ground floor of the building and of the outdoor devices.

Particularly, the control and/or the monitoring is carried out remotely, in particular by using a wireless communication protocol, for example a radio communication protocol. Each central control unit U1, U2 is arranged to group together all the data coming from the devices D of its group DGrU1, DGrU2 and to process these data.

Figure 2:
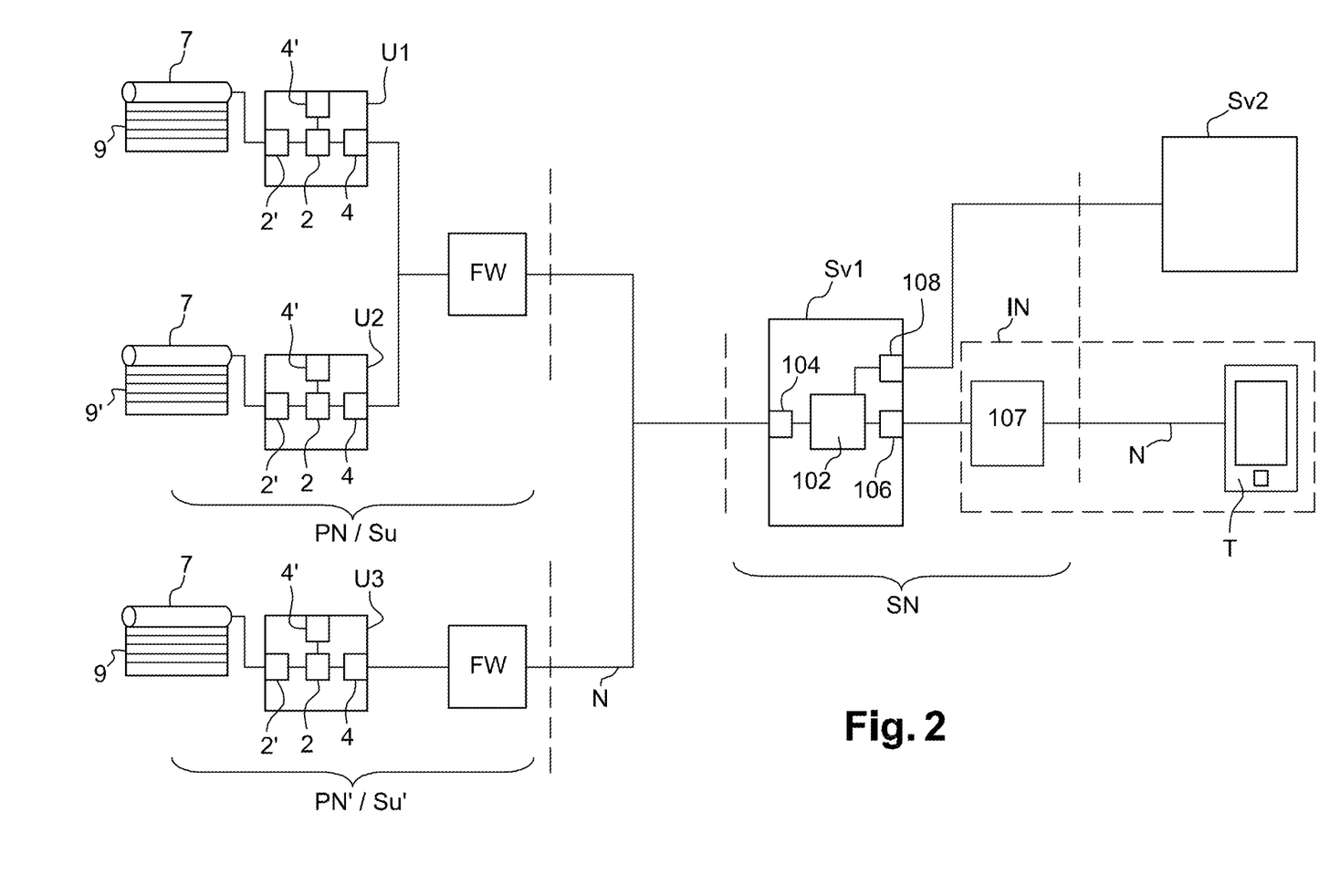
FIG. 2 is a diagram showing an architecture of a system comprising the home automation installation illustrated in FIG. 1, a second home automation installation, as well as a server intended to be connected to a user terminal.

As shown in FIG. 2, each central control unit U is arranged to communicate with a server Sv1.

The central control units U1, U2, U3 are disposed on a private network PN, PN', whose access is generally protected by a firewall FW. Particularly, in the example shown in FIG. 2, two central control units U1, U2 are disposed on a first private network corresponding to a first home automation installation, while a third central control unit U3 is disposed on a second private network PN', independent of the private network PN corresponding to a second home automation installation Su'. The server Sv1 is also disposed on a private network SN. The private network PN is connected to a wide area network N, for example Internet. Of course, the server Sv1 is arranged to communicate with a set of such central control units U. One of these units will be described afterwards.

A central control unit U comprises a processing unit 2 arranged to contain and execute a first computer program. For example, the processing unit 2 comprises a processor, a storage flash memory and a random-access memory, and an Ethernet chip.

The processing unit executes an embedded software. This software is updated to improve its functions or make corrections.

The central control unit U further comprises at least one communication module 2' intended to monitor and/or control home automation equipment 3 and/or sensors 5, the home automation equipment 3 may be actuators 7, lights 21, an alarm system, or a video camera.

For example, as shown in FIG. 2, the communication module 2' allows monitoring and controlling at least one actuator 7, a mobile element of the building 1, such as for example a roller shutter 9, or an orientable sunshade 9' or other actuators 7 or lights 21, as previously described with reference to FIG. 1, according to the first local communication protocol P1.

For example, the communication module 2' can be arranged to implement, for example, one or more of the first local protocol(s) P1, for example of the Z-Wave, EnOcean, IO Homecontrol, Somfy RTS, KNX, MODBUS, Wavenis, Philips HUE type. These first local protocols are generally non-IP local communication protocols.

According to another possibility, for example under alarm systems, the central control unit can be integrated into the home automation device. According to yet another possibility, it is also possible that the central control unit is integrated into a router and/or modem making a connection to a wide area network, in particular to Internet.

In the case where the central control unit is integrated into a home automation device, the communication module 2' intended to monitor and/or control the device can be a communication module internal to the home automation device and/or a communication module intended to monitor and/or control other home automation devices.

Receiving information from a sensor 5 providing a user presence information or values of the surrounding parameters, such as temperature, humidity and brightness, is also provided. In the same way, the central unit U can allow monitoring and/or controlling an alarm system.

Each central control unit U may further comprise a communication module 4' to communicate according to a second target communication protocol P2, with a mobile communication terminal T. The second target communication protocol may for example be a communication protocol above the IP protocol on a local area network, or else a generic point-to-point protocol. For example, the WEAVE application protocol using 6lowpan and thread transport protocols for a mesh network may constitute a second target protocol. Other examples include Bluetooth, Zigbee or Wifi.

The communication terminal T can contain and execute an application software APP.

Each central control unit U further comprises a communication module 4 with the server Sv1. The server Sv1 allows the remote control and/or monitoring and comprises one or more processing unit(s) 102 arranged to contain and execute a second computer program.

In some applications, a central control unit U can communicate with the server Sv1 via an intermediate server, for example from a third-party service provider, whose intermediate server provides a service interface or API. The server Sv1 comprises, for its part, at least one communication interface 104 intended for the communication with the central unit U.

The server Sv1 may also comprise a communication interface 106 intended for the communication with a control and/or monitoring interface IN allowing a final user Usr1 to remotely monitor the home automation installation, in particular via a user service Sv1*c*1.

It should be noted that the term server is a logical designation that can cover the use of several physical servers to distribute the computer processing load to be carried out.

The control and/or monitoring interface IN comprises, for example, a web server 107 and a mobile communication terminal T1 communicating by the wide area network N. The mobile communication terminal T1 may be, for example, a smart phone or a tablet. The mobile communication terminal T1 may be the same or a terminal of the same type as the one with which the central control unit U communicates locally by means of the communication module 4', or a different terminal. These mobile terminals will be designated indifferently by the reference T1. Alternatively, the final user could also make use of a fixed terminal.

The control and/or monitoring interface IN1 comprises a processor that can be disposed at the web server 107 and/or the mobile communication terminal T1.

The processor of the control and/or monitoring interface IN is arranged to use a third computer program. This third computer program is in turn arranged to execute a downloadable application.

The mobile communication terminal T comprises a data input device and a display device, for example in the form of a touch control part of a screen of the terminal T and in the form of one or more button(s) of the terminal T.

The server Sv1 may also comprise a communication interface 108 intended for the communication with another server Sv2 under the responsibility of another entity than that which operates the server Sv1 and which proposes at least one second service as will be described later. This interface allows communication between the two servers Sv1 and Sv2 on a local or wide area network, for example Internet.

Unique Identifier of a Home Automation Device

The server Sv1 and the central control units U can use a unique identifier to identify the home automation devices. The structure of a unique identifier of a home automation device DURL will now be described correspondingly to a particular embodiment.

According to this embodiment, the unique identifier of a home automation device comprises information on:

The local native protocol of the home automation device D;

The communication path toward the device D, including the intermediate central control units U and the termination addresses to cross, organized or not in a hierarchical topology;

A subsystem identifier subsystemId if the device belongs to a group of devices D associated with a same address. The devices that are a unique expression of an address do not have an identification extension of a subsystem.

Thus, the form of the unique identifier of a device DURL can be as follows:

<Protocol>://<gatewayId>/<rawDeviceAddress>(#<subsystemId>)

Wherein the following fields are present:

protocol: identifier of the native device local protocol;

gatewayid: identifier of the first central control unit U, for example a serial number or a unique identifier.

rawDeviceAddress: a simple or multi-level path. Its meaning and format depend on the addressing scheme of the local communication protocol of the device D.

subsystemId: this optional field indicates an identification, for example a rank of the subsystem (starting for example at 1), if such a subsystem is present.

Examples 1) knx://0201-0001-1234/1.1.3

This unique identifier DURL corresponds to a device D communicating by the protocol KNX with an individual address 1.1.3 accessible by the central control unit U carrying the identifier #0201-0001-1234.

2) io://0201-0001-1234/145036#2

This unique identifier GDURL corresponds to a subsystem carrying the number 2 associated with a device D communicating by the protocol IO homecontrol with a radio address 145036 accessible by the central control unit U carrying the identifier #0201-0001-1234.

First Third-Party Service and Second Third-Party Service

Figure 3:
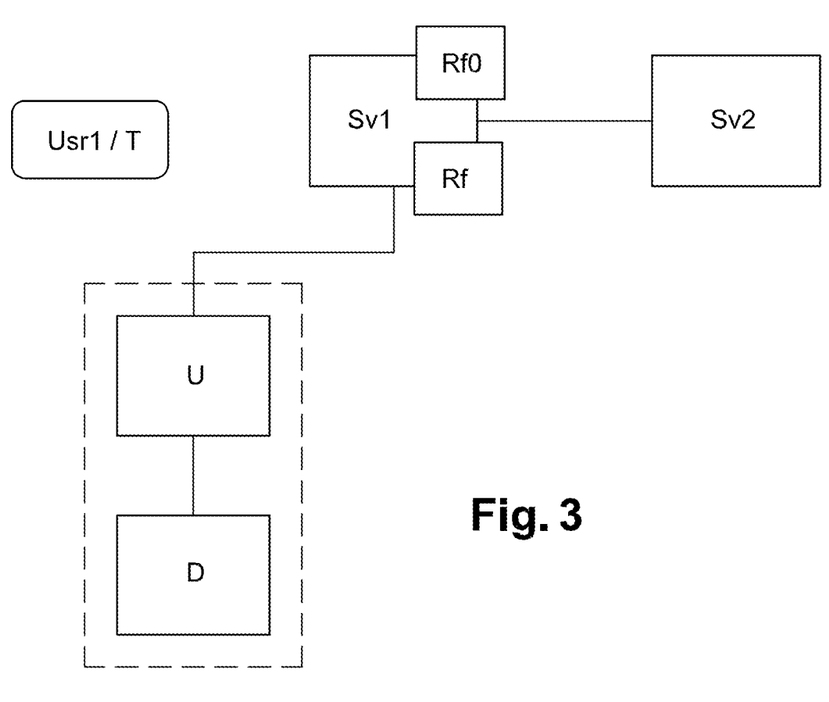
FIG. 3 is a diagram showing a server or a server group intended to execute a first remote access service and a second server or server group intended to execute a second remote access service.

The server Sv1 or a server group Sv1 hosts one or more software server(s) intended for providing services, as shown in FIG. 3.

Particularly, a first service Svc1 corresponds to a user service intended for remotely monitoring the home automation installation Su by a final user Usr1. The user service Svc1 is a remotely accessible computerized service, which allows access to at least one control or supervision function of a home automation installation or a home automation device, by means of a user interface. The user interface can be accessible by a graphical interface, or via a programming interface.

A second service Svc2 corresponds to a third-party service, which is able to remotely generate at least one instruction for performing at least one control for at least one home automation device D of an installation Su, or to process data coming from at least one home automation device D.

The first service Svc1 may be under the monitoring of a first entity and the second service Svc2 may be under the monitoring of a second entity. The second service can be considered as a partner service to which access can be granted.

For example, the first entity may be an infrastructure or a home automation installation management provider, and the second entity may be a provider of services related to data or home automation devices control. Particularly, it is possible to consider an installation comprising a device D of the consumption sensor type, for example a power consumption sensor. The second service Svc2 can provide a consumption tracking functionality that requires access to consumption data generated by the consumption sensor. For example, the second service may be an energy provider user service.

Access Right Repository and Identification Token

The first service Svc1 implements an access right repository Rf. The access right repository Rf establishes the correspondence between a second calling service Svc2 and the authorized actions on the resources Rc of the first service Svc1. A resource Rc is an identifier of a logical element of a home automation installation Su under the monitoring of the first service Svc1, optionally arranged to have different granularity levels depending on the possibilities of the service Svc1. Thus, a resource Rc may consist of an entire installation St or a home automation device D or a set of devices D, or even one or more control(s) C or function(s) or state variable(s) S of a home automation device D. According to a particular embodiment, the resources can be organized in a hierarchical manner using a resource identifier of the access path type corresponding for example to the identifier of the device DURL described above, by optionally adding a complementary resource Rc identifier, or by defining intermediate levels corresponding to an access to several elements of the defined tree. Table 1 below gives an example of a first data structure of the repository Rf.

Thus, a service Svc2, accepted by a user Usr1 associated with a home automation installation Su managed by the service Svc1 and containing a device D1, will have to provide the identification token Tk associated with this installation in its request to the service Svc1. Table 2 below gives an example of a second data structure of the repository Rf

TABLE 2

Example of a second data structure of the repository Rf

| Second service Svc2 | Token |
|---|---|
| Svc2a | Tka |
| Svc2b | Tkb |

The identification token for a second service may be invalidated by the first service if there is no longer any agreement between the first entity monitoring the first service and the second entity monitoring the second service or else if the user deletes his authorization to the second service. It is also possible that the token is invalidated after a predetermined period if the token is not renewed.

For example, the repository may be constituted by a database or a directory service. This repository may be comprised in the first service Svc1 or external and accessible by the first service Svc1. According to an alternative or complementary embodiment, the access rights repository may use calculation algorithms taking as input the information of the device, the state variable and the second service (identifier and value type) and returning a Boolean result indicating whether the access is authorized.

TABLE 1

Example of a first data structure of the repository Rf

| Second Service Svc2 | Resources Rc | Authorized actions |
|---|---|---|
| Svc2 | setup/1234/sensors/temperature/* | READ |
| Svc2 | setup/1234/actuators/rollershutters/*/command/open | EXECUTE |

In this example of a repository, the service Svc2 is authorized to read the state variables of the temperature sensors of the installation no 1234 and to use the control «open» on all roller shutter-type actuators.

Thus, when the second service Svc2 will perform a reading or control request to Svc1 on a given resource Rc, it will be able to verify, in its access rights repository Rf, whether the request can be authorized. Similarly, in the case where the information relating to resources Rc under the monitoring of the first service Svc1 are updated, such as changes in the value of the state variables of the home automation devices D, this information may be automatically retransmitted to the service Svc2 if the associated resource Rc is authorized to be read in the repository Rf.

In order to securely identify requests coming from the service Svc2, the service Svc1 may use an identification token Tk of the service Svc2.

This identification token Tk may be of permanent or limited validity, in which case it will have to be regularly re-negotiated to the first service Svc1. This token will be stored in the repository Rf of the service Svc1 to perform the correspondence with the authorizations on resources.

Access Rules Definition Repository

In order to define the access rights contained in the access right repository Rf, the first service can use an access rules definition repository Rf0, which can be comprised in the access right repository or distinct, but accessible by the first service Svc1.

The access rules definition repository Rf0 comprises associations between a type of home automation device DT, at least one second service Svc2 and optionally access or filtering rules. Thus, the first service Svc1 can determine a second service associated with the home automation device D1 for which a remote access must be configured with corresponding access or filtering rules. The type of authorization given to a second service Svc2 can be defined according to rules established between the first entity monitoring the first service Svc1 and the second entity monitoring the second service Svc2. An example of an access rules definition table contained in the access rules repository Rf0 is shown below in Table 3.

TABLE 3

Example of access rules definition table

| Device type DT | Second service | Authorized actions |
|---|---|---|
| DT1 | Svc_1 | READ/Temperature |
| DT2 | Svc2- | EXECUTE/Shutter Up/down |

Configuration Method

Figure 4:
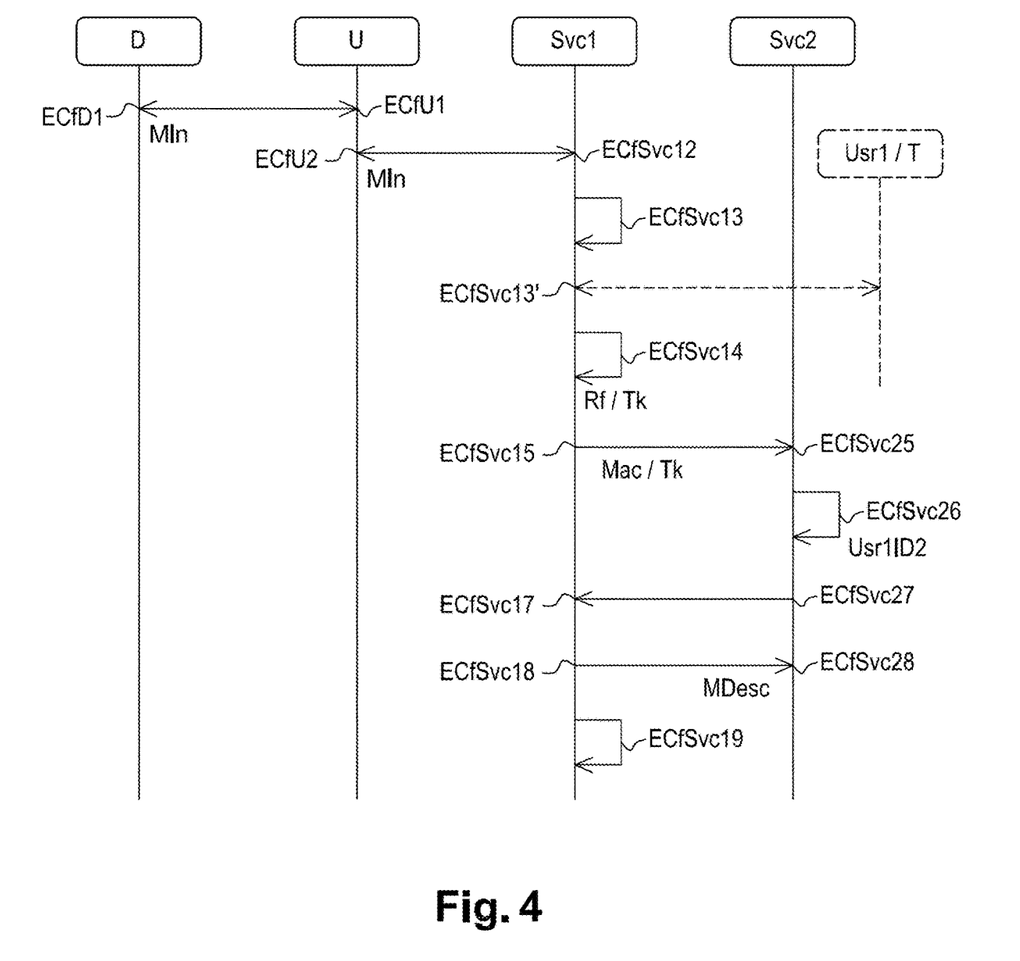
FIG. 4 is a diagram illustrating a mode of implementation of a method for configuring remote access to at least one home automation device of a home automation installation.

A method for configuring a remote access to at least one home automation device D belonging to a home automation installation Su will now be described with reference to FIG. 4.

It will be assumed that the user Usr1 has a user account for the service Svc1 with a corresponding identifier Usr1ID1.

The user Usr1 or an installer proceeds to the installation of a device D1 in his home automation installation Su and to the pairing of this home automation device D1 with a central control unit U present in the installation which corresponds to an information exchange constituting respectively the steps ECfD1 and ECfU1. Alternatively, the information exchange may correspond to the installation of a central control unit U and the discovery by this central control unit U of a previously installed home automation device D. This event corresponds to the establishment of a connection via the network R1 between the central control unit U and the home automation device D.

The central control unit U then proceeds, in a step ECfU2, to sending an information message concerning the presence or the discovery of the home automation device D1 to a management unit Sv which receives this message in a step ECfSvc12.

In a step ECfSvc13, the first service Svc1 consults the access rules definition repository Rf0 in order to determine whether there is a second service associated with the type of home automation device D1 for which a remote access must be configured with corresponding filtering or action rules. It will be assumed here that such a service is defined.

Optionally, the first service can request in a step ECfSvc13' an authorization from the final user Usr1, via a user terminal T prior to the configuration of the remote access, and condition the configuration of the access to a positive response from the user.

The access for the second partner service may be global for a given installation attached to the user account of the user Usr1, or may concern only one device group or a particular home automation device D. Similarly, the access may concern the set of state variables or controls of a device, or concern a subset of state variables or controls of a concerned device according to a filtering. For example, in the case of a second service Svc2 aiming at providing an energy optimization, only reading the values of the state variables S relating to the home automation devices D corresponding to temperature sensors or consumption and/or control C sensors of a heating mode (eco, comfort) of the installation, can be authorized for the service Svc2. Consulting the state variables or triggering the control concerning the other home automation devices of the installation like the lamps, shutters or the doors of access to the dwelling or the garage, for example, will not be authorized for the service Svc2 for security reasons.

The first service Svc1 then proceeds, in a configuration step ECfSvc14 in order to allow accepting control command coming from the second service Svc2 or in order to send supervision data to the second service Svc2. Particularly, the first service Svc1 configures an access rights repository Rf. The structure of this repository has been described previously. The first service Svc1 therefore configures the repository Rf in accordance with the access request received and accepted by the user for given resources Rc in order to obtain for example a structure as described in Table 1.

During the configuration step, an identification token Tk can also be generated for the second service Svc2 and stored in the repository Rf. The token can be communicated to the service Svc2 during a subsequent step.

In a step ECfSvc15, the first service Svc1 transmits an acceptance/registration message to the second service Svc2 which is received by the second service in a step ECfsvc25. The identification token Tk can be communicated for example during this step or during a separate step. The message may contain information about the user Usr1 or his user Usr1 identifier Usr1ID1 on the first service. In the case where the first service has requested an authorization from the final user Usr1 via a user terminal T, the transmission of the acceptance/registration message can also be performed via said terminal T which will receive the message in response to its acceptance from Svc1 and return this message to the second Service Svc2.

In a step ECfsvc26, the second service Svc2 proceeds to configuring or creating a profile or account for the user Usr1, with a corresponding identifier Usr1ID2, and can save the correspondence between the user Usr1 identifier Usr1ID1 on the first service, and the user Usr1 identifier Usr1ID2 on the second service. The second service can also store the identification token Tk.

In a step ECfSvc27, the second service Svc2 then communicates a confirmation of the creation of the user account and optionally the identifier Usr1ID2 created.

In a step ECfSvc18, the first service Svc1 can transmit a description MDesc, or a filtered view of the installation or a group of home automation devices D comprising at least one device, to the second service Svc2, which receives it in a step ECfsvc28.

According to an additional step ECfSvc19, the second service Svc2 can be registered as subscriber to events concerning the at least one device D concerned by the remote access.

Control Method

Figure 5:
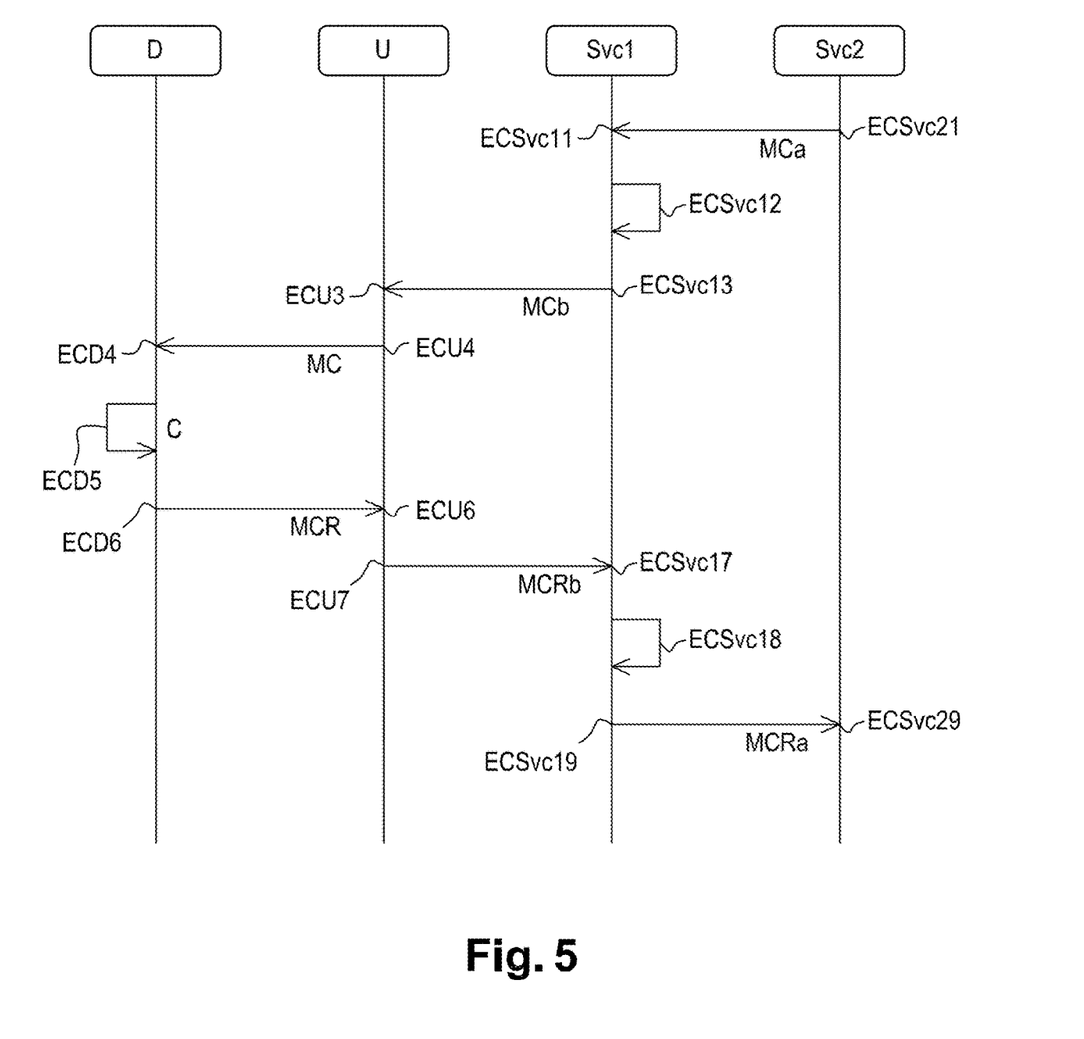
FIG. 5 is a diagram illustrating a mode of implementation of a method for configuring remote access to at least one home automation device of a home automation installation.

A remote control method of at least one home automation device D belonging to a home automation installation D will now be described with reference to FIG. 5. It will be assumed here that the steps of a configuration method have been carried out in accordance, for example with what has been explained above with reference to FIG. 4.

In a step ECSvc21, the second service Svc2 transmits a control message MCa to the first service Svc1 which receives it in a step ECSvc11. This message concerns a home automation device D, and a control C to be carried out on this device. The message MCa also contains identification elements allowing to validate that the request comes from a second authorized service Svc2, such as the identification token Tk obtained during the configuration method.

In a step ECSvc12, the service Svc1 operates a monitoring in order to verify the identification of the second service Svc2 on the base for example of the identification token. The service Svc1 then verifies whether a control requested in the message MCa by the service Svc2 is authorized, that is to say whether it concerns a device D for which authorization has been given during the configuration, and/or whether the concerned control or function is authorized for this device for the second service Svc2. Particularly, this verification is carried out with the repository Rf.

In a step ECSvc13, in the case where the control C is authorized for the service Svc2, the first service Svc1 transmits a control message MCb to a central control unit U to which the home automation device D concerned by the control C is attached, which receives it in a step ECU3. The format of this message can be distinct from that of the message MCa, a format conversion can be performed by the first service.

In a step ECU4, the central control unit U transmits a control message MC to the home automation device D concerned by the control C which receives it in a step ECD4. The format of this message can be distinct from that of the message MCb, a format conversion can be performed by the central control unit U.

In a step ECD5, the home automation device D performs the control C.

In a step ECD6, the return code or the result of the control is communicated in a return message MCR by the device D to the central control unit U which receives it in a step ECU6.

In a step ECU7, the return code or the result of the control is communicated in a return message MCRb by the central control unit U to the first service Svc1 which receives it in a step ECSvc17. The format of this message can be distinct from that of the message MCR, a format conversion can be performed by the first service Svc1.

In a step ECSvc18, the service Svc1 operates a verification in order to determine whether the return code contained in the message MCrb can be transmitted to the service Svc2, particularly whether the return code of the concerned control or function is authorized for this device for the service Svc2. This verification is carried out with the repository Rf.

In a step ECSvc19, in the case where the return code or result can be communicated to the second service, the return code or the result of the control is communicated in a return message MCRa by the first service Svc1 to the second service Svc2 which receives it in a step ECSvc29. The format of this message can be distinct from that of the message MCRb, a format conversion can be performed by the first service Svc1.

Supervision Method

A method for supervising at least one home automation device D belonging to a home automation installation Su will now be described with reference to FIG. 6. It will be assumed here that the steps of a configuration method have been carried out in accordance, for example, with what has been explained above with reference to FIG. 4.

In a step ESD1, the home automation device D transmits a supervision message MS corresponding to an event of change in a state variable S value to the central control unit U to which the considered device D is attached, the central control unit receiving this message in a step ESU1.

In a step ESU2, the central control unit U transmits a supervision message MSb, which takes back information concerning the event of change in the state variable S value or translates them into a different format, so as to transmit them to the first service Svc1, which receives the message MSb in a step ESScv12.

According to one variant, in the case where the central control unit U is integrated into the device D, constituting the supervision message MSb can performed locally upon detecting the trigger event corresponding to the change in a state variable value.

According to another variant, in the case where the central control unit U is distinct from the device D, it is also possible that the device sends messages MS periodically and it is the central control unit U that operates a verification to identify the changes in value. Finally, it is also possible that supervision messages MSb are sent without noting a change in value.

In a step ESSvc13, the first service Svc1 determines whether to send a supervision message MSa to the second service. Particularly, the service Svc1 operates a monitoring in order to verify the identification of the second service Svc2 on the base for example a verification of the identification token Tk validity. The first service Svc1 then verifies whether there is a supervision authorization concerning the device D, that is to say whether it concerns a device D for which an authorization has been given during the configuration and/or whether the communication of the supervision information relating to the concerned state variable S is authorized for this device for the service Svc2. Particularly, this verification is carried out with the repository Rf.

Thus, a filtering on one type of state variable S can be performed, or even a filtering over ranges of the state variable S value.

In a step ESSvc14, and to the extent that the first service Svc1 has determined that such a message MSa should be sent, the first service Svc1 transmits a supervision message MSa to the second service Svc2, which receives the message in a step ESSvcs24.

Figure 6:
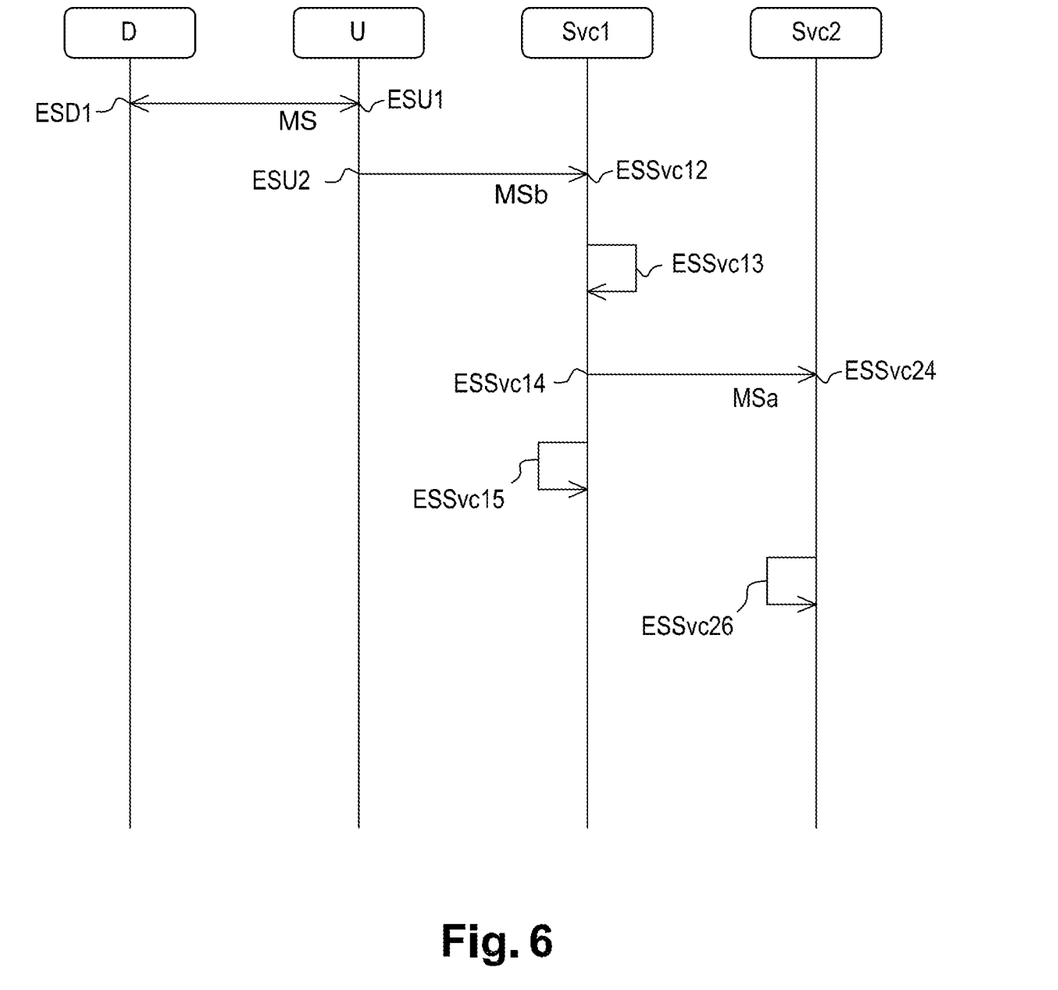
FIG. 6 is a diagram illustrating a mode of implementation of a method for remotely supervising at least one home automation device of a home automation installation.

In FIG. 6, the steps ESSvc14 and ESSvc24 represent a notification between the first service Svc1 and the second service Svc2 which corresponds to a direct sending. However, it is possible that other mechanisms are used.

Particularly, according to a first variant, a queuing mechanism can be implemented, the messages can be stored by the first service on the queue, and asynchronously collected by the second service.

Other push/pull-type systems can also be used.

In a step ESSvc15, a local storage of information relating to the state variables can be performed by the first service Svc1. It is possible that information filtering is performed at this stage. This configuration is in particular useful in the case where the device D is the property or under the monitoring of a second entity in charge of the second service Svc2, the first service Svc1 and optionally the central control unit, being under the monitoring of a first entity and acting as an intermediate infrastructure service. Thus, the first service Svc1 can play the role of a communication channel between home automation devices D of a home automation installation Su and a second service Svc2 without being authorized to consult or keep the data it transits. It should be noted that it is also possible that no storage is performed.

In a step ESSvC26, a local storage of information relating to the state variables S can be performed by the second service Svc2.

The invention claimed is:

1. A method for configuring remote access to at least one home automation device belonging to a home automation installation, the home automation installation comprising the at least one home automation device and at least one central control unit, the at least one home automation device having a device type, the method being implemented by a first remote access service executed by a management unit and comprising the following steps:

receiving an information message from the at least one central control unit, to which the at least one home automation device is attached, concerning a presence of the at least one home automation device;

consulting an access rules definition repository;

determining from the access rules definition repository a second service associated with a device type of the at least one home automation device;

configuring an access right repository in order to accept at least one control command coming from the second service or sending supervision data to the second service on behalf of the at least one home automation device.

2. The method according to claim 1, wherein the configuring step comprises a step of generating an identification token for the second service.

3. The method according to claim 2, comprising the following step, prior to the configuring step:

requesting an access authorization for the benefit of the second service to a user.

4. The method according to claim 3, comprising the following step:

sending an acceptance/registration message to the second service.

5. The method according to claim 4, comprising the following step:

sending at least one description or transmission message of a filtered view of the home automation installation or a group of home automation devices comprising at least one device, to the second service.

6. The method according to claim 1, comprising the following step, prior to the configuring step:

requesting an access authorization for the benefit of the second service to a user.

7. The method according to claim 6, comprising the following step:

sending an acceptance/registration message to the second service.

8. The method according to claim 7, comprising the following step:

sending at least one description or transmission message of a filtered view of the home automation installation or a group of home automation devices comprising at least one device, to the second service.

9. The method according to claim 1, comprising the following step:

sending an acceptance/registration message to the second service.

10. The method according to claim 1, comprising the following step:

sending at least one description or transmission message of a filtered view of the home automation installation or a group of home automation devices comprising at least one device, to the second service.

* * * * *